Nov. 4, 1952
G. HEPP
2,617,034

CARRIER WAVE GENERATOR

Filed Jan. 23, 1948

INVENTOR.
GERARD HEPP
BY Fred M Vogel
AGENT.

Patented Nov. 4, 1952

2,617,034

UNITED STATES PATENT OFFICE 2,617,034

CARRIER WAVE GENERATOR

Gerard Hepp, Eindhoven, Netherlands, assignor to Hartford National Bank and Trust Company, Hartford, Conn., as trustee Application January 23, 1948, Serial No. 4,023
In the Netherlands February 5, 1947

4 Claims. (Cl. 250—36)

The invention relates to a circuit-arrangement for generating a number of adjacent carrier-waves for use in systems for multi-channel carrier telephony.

It is known per se to generate a number of adjacent carrier-waves by means of an oscillation $f_0$ which is frequency-modulated by a modulating oscillation having a frequency $p$ of constant value, the frequency spectrum of such an oscillation having the shape of a band comprising a number of side-band oscillations uniformly spaced apart by a distance which is equal to the modulation frequency $p$ and the width of the band being about double the frequency sweep F (Fig. 2).

It was found to be particularly suitable to shape the modulating oscillation in the form of a sawtooth-shaped modulation and in this case the various side-band oscillations are found to exhibit substantially identical amplitudes. These side-band oscillations may be isolated by means of filters and be used as carrier waves in multi-channel carrier telephony systems.

The well-known circuit-arrangement has a limitation in that if under certain conditions the central frequency $f_0$ of the said frequency-modulated oscillation shifts by an amount of $\Delta f$, the frequencies of all the generated side-band oscillations (carrier waves) shift by the same amount of $\Delta f$ and this is inadmissible in a carrier-current telephony system.

Various measures are known to maintain the central frequency of a frequency modulated oscillation to be constant but they are in general comparatively expensive since they involve the use of a supplementary control mechanism.

The invention has for its object to provide a very simple means which, substantially without additional cost, obviates the difficulty that shifting of the central frequency $f_0$ of the frequency-modulated oscillation has the effect of varying the frequency of the generated carrier waves.

According to the invention, for this purpose the valve oscillator by means of which the oscillation having the central frequency $f_0$ is generated, is interrupted periodically for a short period, the frequency $q$ by means of which the oscillation is periodically suppressed (suppressing frequency) being equal to or an $n$th harmonic of the modulation frequency $p$ ($n$ smaller than 10).

It is found in particular that a highly satisfactory circuit-arrangement may be obtained if moreover the central frequency $f_0$ is a higher harmonic of the modulation frequency curve $p$.

Figure 1:
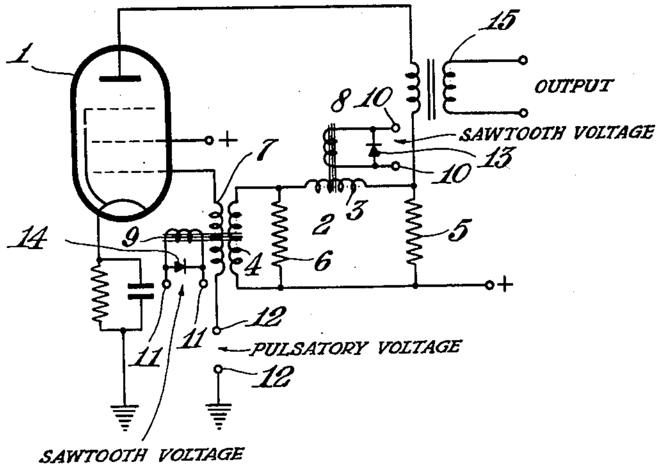
Figure 2A:
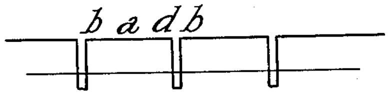
Figure 2B:
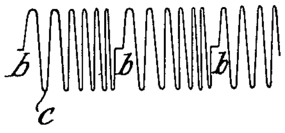
Figure 2C:
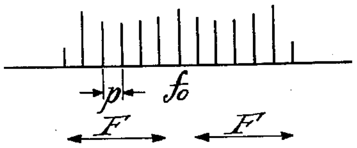

In order that the invention may be more clearly understood and readily carried into effect it will now be described more fully with reference to the accompanying drawing, in which Fig. 1 shows one embodiment, and Fig. 2 shows the suppressing oscillation (Fig. 2a), the generated oscillation (Fig. 2b) and the frequency spectrum of the latter (Fig. 2c).

Referring to Fig. 1, 1 designates a valve oscillator for generating a frequency-modulated oscillation having a central frequency $f_0$. For this purpose, its anode circuit comprises an RL network 2 comprising inductances 3 and 4 and resistances 5 and 6, the inductance 4 being coupled to a coupling coil 7 included in the grid circuit of the valve 1. The inductances 3 and 4 comprise cores of ferromagnetic material, for example ferrite, the permeability of which is adapted to be varied by means of a pre-magnetizing current which passes through pre-magnetizing coils 8 and 9 respectively. The frequency $f$ adapted to be generated by means of this oscillator circuit is given by the formula $f=R/2\pi L$, R being the value of the resistances 5 and 6 and L that of the inductances 3 and 4, the resistances and inductances being assumed to be identical for the sake of simplicity. By varying the value of the inductances by means of a modulating oscillation which is fed to the terminals 10 and 11 respectively of the windings 8 and 9 respectively and is preferably shaped in the form of a sawtooth-shaped current, the anode circuit of the valve 1 has set up in it a frequency-modulated oscillation the frequency spectrum of which has substantially the shape shown in Fig. 2c. This oscillation is adapted to be abstracted by means of an output transformer 15.

The circuit-arrangement so far described has a limitation in that if the central frequency of the generated frequency-modulated oscillation shifts by an amount of $\Delta f$, the frequencies of all the generated side-band frequencies shift by the same amount of $\Delta f$. According to the invention, this difficulty is obviated by a suppressing oscillation which is fed to the terminals 12 in the grid circuit of the valve 1 and suppresses the self-oscillation and the frequency $q$ of which is equal to or a higher harmonic of the modulating frequency $p$, said suppressing oscillation being formed in the shape of a short impulse.

Known per se is a circuit-arrangement which permits of generating a number of adjacent carrier waves by periodically suppressing the high-frequency oscillation of constant frequency $f_0$, the period over which the oscillation is suppressed being large compared with the period over which it is not suppressed. The frequency spectrum of such a periodically suppressed high-frequency oscillation only contains higher harmonics of the suppressing frequency *q*, since the instantaneous value of the generated frequency is periodically repeated with a period equal to the suppressing frequency *q*, on the assumption that the variation of the frequency of the high-frequency oscillation takes place slowly. Since the suppressing oscillation is adapted to be abstracted from an oscillator of highly constant frequency, for example a crystal oscillator, the generated carrier waves will also be substantially free from frequency-shifts.

However, this circuit-arrangement has a limitation in that on the one hand the frequency spectrum is very wide and on the other hand the amplitudes with which the various frequencies are generated are very low. The latter fact may be readily appreciated by reference to an energy balance for the various frequencies. The high-frequency oscillation is generated for only a small part of the period of the suppressing oscillation so that this oscillation represents only a low energy. In addition, the number of generated carrier waves is very high so that the energy accumulated in each of these carrier waves can only have a low value. If the period over which the oscillation is suppressed were shortened, the amplitudes of the various frequencies would tend to be greatly different and this is undesirable.

The invention has the advantage over the last-mentioned known circuit-arrangement that on the one hand the amplitudes of the generated side-band oscillation are very large since the period over which the high frequency oscillation is suppressed is small compared with the period over which it is not suppressed and on the other hand the advantage of the first-mentioned known circuit-arrangement, in which the amplitudes of the various generated side-band oscillations may be substantially identical, is maintained.

A further advantage of the circuit-arrangement according to the invention over the first-mentioned known circuit-arrangement is that substantially no additional cost need to be made since the suppression oscillation *q* is adapted to be derived in a simple manner from the modulating oscillation *p*. This may be illustrated as follows by the embodiment shown.

Connected in parallel with the pre-magnetizing windings 8 and 9 of the inductances 3 and 4 are rectifiers 13 and 14 which may be realized for example as diodes and as rectifier cells respectively. The terminals 10 and 11 or 12 respectively have in addition fed to them a modulating or suppressing voltage respectively which generally has a constant value and which with a frequency equal to the modulation frequency assumes a lower value in the form of an impulse for a short period. This voltage variation is designated *a* in Fig. 2*a*. At the moment of time *b* when this voltage reassumes its constant value the grid of the valve 1 has a sufficiently low negative bias to enable the circuit to self-oscillate. At this instant starts a current distribution between the winding 8 and the diode 13 and between the winding 9 and the diode 14 respectively. The current passing through the inductance increases gradually so that the oscillation generated in the anode circuit of the valve 1 and adapted to be abstracted through an output transformer 15 is formed in the shape of curve *c* of Fig. 2*b*. At the instant *d* when the modulating voltage reassumes the low value the grid voltage of the valve 1 becomes negative to the extent of preventing the circuit from self-oscillation and the voltage pulse occurring across the coils 8 and 9 cannot result in a current pulse, since the rectifier cells 14 and 13 do not allow for the passage of such voltage pulses. As is shown in Fig. 2*b* by the curve *c* the phenomenon is periodically repeated with a frequency equal to the suppressing frequency *q* so that the frequency spectrum of the generated oscillation *c* only contains higher harmonics of the frequency *p* of this suppressing oscillation *q*. Since the suppressing oscillation is adapted to be abstracted from a valve oscillator of highly constant frequency, for example a crystal oscillator, the generated carrier waves will also be substantially free from frequency shifts.

If the modulation frequency *p* is a harmonic of the central frequency $f_0$ and the generated oscillation, the energy, and hence the amplitude, with which the various generated frequencies occur will be identical as far as possible.

In summary, it is pointed out that the purpose of the invention is to produce a plurality of adjacent carrier waves and to this end there is provided a controllable carrier wave generator including tube 1 having a predetermined central frequency $f_0$. The generator is frequency modulated by a sawtooth voltage *p* applied at terminals 10 and 11 to produce a series of side-band components on either side of central frequency $f_0$, the spacing between the band components being equal to modulation voltage *p*. As shown in Fig. 2*c*, the frequency swing on either side of $f_0$ is in accordance with the amplitude of the modulation voltage, whereas the spacing between the side-band components corresponds to frequency *p*. To illustrate this point, let us assume that central frequency $f_0$ is 100 kc. and that the modulation voltage is 3 kc. Since the modulation voltage is non-sinusoidal, specifically in sawtooth form, harmonic components exist therein which result in side-band components spaced at 3—6—9—12, etc., kc. positions on either side of $f_0$ to provide the desired plurality of adjacent carrier waves.

The invention is concerned with avoiding a shift in the central frequency $f_0$, which shift gives rise to a corresponding shift in the side-band components. Inasmuch as in a multi-carrier telephony system the various side-band carrier components are separated by sharply tuned filters to serve as distinct carriers, any significant displacement in these components will render the telephony system inoperative. The invention is based on the finding that the central frequency of the generated carrier wave will exhibit an undesired shift in frequency only after a relatively long interval of oscillation, so that by periodically interrupting the generation of the carrier wave by means of successive impulses, the duration of operation subsequent to the interruption is relatively brief and the oscillations thus generated are of stable frequency.

However, the periodic interruption of the generator by successive impulses creates another problem by reason of the fact that as the impulses are of extremely short duration, higher order harmonics of the impulse frequency are produced, as will be evident from a Fourier analysis of the impulse form. Since the higher order harmonics of the impulses will fall within the operating range of the generator, it is essential in avoiding interference that these harmonics be coincident with the side-band components, otherwise spurious carrier components will be exhibited. With this in mind, the frequency of the successive impulses is harmonically related to the frequency of the modulation voltage so that the periodic suppression of the generator does not result in the production of carrier components other than those produced by the modulation voltage.

The invention is not limited to the embodiment shown. Use may notably be made of other oscillator circuits having a variable frequency; the variable reactance may be constituted in known manner by reactance valves; the suppressing oscillation may be the $n$th harmonic of the modulating oscillation, the modulating sawtooth-like oscillation may be generated, for example, without the use of the rectifiers 13 and 14, and instead, for example, by means of a discharge tube which is connected in series with the inductances 8 and 9 and which is operated, for example, in such manner that the anode current depends on the anode voltage and so forth. In addition it is found that the effect according to the invention is maintained if the suppressing frequency $q$ is an over- or under-harmonic of the modulation frequecy $p$.

What I claim is:

1. Apparatus for producing a plurality of adjacent carrier waves comprising a controllable carrier wave generator having a predetermined central frequency of operation, means to frequency-modulate said generator about said central frequency in accordance with a relatively low-frequency modulation voltage to produce within the range of deviation effected by said voltage a series of side band components on either side of said central frequency, the spacing between said side band components corresponding to the frequency of said modulation voltage, and means to apply successive impulses to said generator to render it periodically inoperative, the frequency of said modulation voltage and the frequency of said impulses being harmonically related.

2. Apparatus for producing a plurality of adjacent carrier waves comprising a controllable carrier wave generator having a predetermined central frequency of operation, means to frequency-modulate said generator about said central frequency in accordance with a relatively low-frequency sawtooth modulation voltage to produce within the range of deviation effected by said sawtooth voltage a series of side band components on either side of said central frequency, the spacing between said side band components corresponding to the frequency of said modulation voltage, and means to apply successive impulses to said generator to render it periodically inoperative, the frequency of said impulses being equal to an $n$th harmonic of the frequency of said modulation voltage, where $n$ is an integer less than 10.

3. Apparatus for producing a plurality of adjacent carrier waves comprising a controllable carrier wave generator having a predetermined central frequency of operation, means to frequency-modulate said generator about said central frequency in accordance with a relatively low-frequency sawtooth modulation voltage to produce within the range of deviation effected by said sawtooth voltage a series of side band components on either side of said central frequency, the spacing between said side band components corresponding to the frequency of said modulation voltage, and means to apply successive impulses to said generator to render it periodically inoperative, the frequency of said impulses being equal to an $n$th harmonic of the frequency of said modulation voltage, where $n$ is in integer less than 10, the frequency of said central frequency being a relatively high harmonic of the frequency of said modulation voltage.

4. Apparatus for producing a plurality of adjacent carrier waves comprising a controllable carrier wave generator including a grid-controlled electron discharge tube and having a predetermined central frequency of operation, means to frequency-modulate said generator about said central frequency in accordance with a relatively low-frequency saw tooth modulation voltage to produce within the range of deviation effected by said voltage a series of side band components on either side of said central frequency, the spacing between said side band components corresponding to the frequency of said modulation voltage, means to apply successive impulses to the grid of the tube in said generator to render it periodically inoperative, the frequency of said modulation voltage and the frequency of said impulses being harmonically related, the frequency of said central frequency being a relatively high harmonic of the frequency of said modulation voltage, and means to derive said side band components and oscillations of said central frequency from said generator.

GERARD HEPP.

REFERENCES CITED

The following references are of record in the file of this patent:

UNITED STATES PATENTS

| Number | Name | Date |
|---|---|---|
| 2,416,327 | Labin | Feb. 25, 1947 |
| 2,444,437 | Grieg | July 6, 1948 |

FOREIGN PATENTS

| Number | Country | Date |
|---|---|---|
| 561,331 | Great Britain | May 18, 1944 |